(12) United States Patent
Ohmi et al.

(10) Patent No.: US 7,416,165 B2
(45) Date of Patent: Aug. 26, 2008

(54) DIAPHRAGM VALVE FOR THE VACUUM EXHAUSTION SYSTEM

(75) Inventors: Tadahiro Ohmi, 1-17-301, Komegahukuro 2-chome, Aoba-ku, Sendai-shi, Miyagi (JP) 9800813; Nobukazu Ikeda, Osaka (JP); Michio Yamaji, Osaka (JP); Masafumi Kitano, Osaka (JP); Akihiro Morimoto, Osaka (JP)

(73) Assignees: Tadahiro Ohmi, Sendai-shi, Miyagi (JP); Fujikin Incorporated, Osaka-shi, Osaka (JP)

( * ) Notice: Subject to any disclaimer, the term of this patent is extended or adjusted under 35 U.S.C. 154(b) by 121 days.

(21) Appl. No.: 10/546,032

(22) PCT Filed: Feb. 9, 2004

(86) PCT No.: PCT/JP2004/001346

§ 371 (c)(1),
(2), (4) Date: Aug. 18, 2005

(87) PCT Pub. No.: WO2004/074722

PCT Pub. Date: Sep. 2, 2004

(65) Prior Publication Data

US 2006/0175573 A1 Aug. 10, 2006

(30) Foreign Application Priority Data

Feb. 18, 2003 (JP) ............................. 2003-039541

(51) Int. Cl.
*F16K 31/122* (2006.01)
*F16K 7/17* (2006.01)

(52) U.S. Cl. ...................................... 251/331; 251/368

(58) Field of Classification Search ................. 251/331, 251/62, 368, 359; 137/375
See application file for complete search history.

(56) References Cited

U.S. PATENT DOCUMENTS 2,406,963 A * 9/1946 Norton ....................... 251/359
3,487,823 A * 1/1970 Tarter et al. ................. 251/359
3,750,698 A * 8/1973 Walchle et al. .............. 137/375

(Continued)

FOREIGN PATENT DOCUMENTS

JP 11-118049 A 4/1999

(Continued)

*Primary Examiner*—Stephen M. Hepperle
*Assistant Examiner*—Cloud K Lee
(74) *Attorney, Agent, or Firm*—Griffin & Szipl, P.C.

(57) ABSTRACT

A diaphragm valve 1 is provided with a body 2 having a flow-in passage 6, a flow-out passage 7, and a valve seat 8 formed between the passages; a diaphragm 3 installed in the body 2 and permitted to rest on and move away from the valve seat 8; and a driving means 4 installed on the body 2 to allow the diaphragm 3 to rest on and move away from the valve seat 8, wherein synthetic resin films 5 of predetermined thickness are coated on fluid-contacting parts 25 of the afore-mentioned body 2 and diaphragm 3. A diaphragm valve in accordance with the present invention prevents corrosion of the valve members caused by accumulation and adherence of substances produced by thermal decomposition, and prevents clogging caused by substances produced, and prevents seat leakage when applied in the vacuum exhaust system of a semiconductor manufacturing facility.

9 Claims, 4 Drawing Sheets

U.S. PATENT DOCUMENTS

| | | | | |
|---|---|---|---|---|
| 4,317,713 | A | * | 3/1982 | Burk et al. .................. 208/113 |
| 4,337,144 | A | * | 6/1982 | Yoo ....................... 208/120.01 |
| 4,763,876 | A | * | 8/1988 | Oda et al. ................... 251/359 |
| 5,127,430 | A | * | 7/1992 | Powers et al. ............... 137/375 |
| 5,413,311 | A | | 5/1995 | Arstein et al. |
| 5,520,213 | A | | 5/1996 | Muller |
| 5,658,452 | A | * | 8/1997 | Heyse et al. .............. 208/48 R |
| 5,820,105 | A | * | 10/1998 | Yamaji et al. ............... 251/368 |
| 5,836,568 | A | * | 11/1998 | Ishigaki et al. .............. 251/148 |
| 5,967,492 | A | * | 10/1999 | Navratil et al. .............. 251/331 |
| 6,409,149 | B1 | * | 6/2002 | Maher, Jr. ................... 251/328 |
| 6,941,963 | B2 | * | 9/2005 | Maula et al. .................... 137/1 |
| 2004/0118455 | A1 | * | 6/2004 | Welty et al. ................. 137/375 |
| 2005/0285064 | A1 | * | 12/2005 | Yoshino et al. ............ 251/61.5 |

FOREIGN PATENT DOCUMENTS

| | | |
|---|---|---|
| JP | 3343313 B2 | 8/2002 |
| JP | 2002-323147 A | 11/2002 |
| JP | 3343313 B2 | 11/2002 |
| JP | 2003-166660 A | 6/2003 |

* cited by examiner

DIAPHRAGM VALVE FOR THE VACUUM EXHAUSTION SYSTEM

This is a National Phase Application in the United States of International Patent Application No. PCT/JP2004/001346 filed Feb. 9, 2004, which claims priority on Japanese Patent Application No. 2003-039541, filed Feb. 19, 2003. The entire disclosures of the above patent applications are hereby incorporated by reference.

FIELD OF THE INVENTION

The present invention is applicable to, for example, the semiconductor manufacturing equipment. More particularly, the present invention is concerned with improvements in a diaphragm valve to be used in the system for the vacuum exhaustion from a process chamber employed in the semiconductor manufacturing.

BACKGROUND OF THE INVENTION

Generally, a gas having high chemical reactivity is supplied to the process chamber used in the semiconductor manufacturing facilities and the like. Accordingly, the vacuum exhaustion system for the process chamber is required to exhaust high reactivity gases in safety and with a high degree of efficiency.

Normally, the piping system in the semiconductor manufacturing facilities comprises a system to supply a gas to the process chamber, the process chamber, the vacuum exhaustion system, vacuum pumps, a diaphragm valve and the like. For the vacuum pumps, a plural number of pumps, that is, a primary pump (of the high vacuum type) installed immediately after the process chamber and a secondary pump (of the low vacuum type) installed on the secondary side thereof are employed. A turbocharged molecular pump is used for the high vacuum type one, while a scroll type pump is used for the low vacuum type one.

To effect an efficient exhaustion from the process chamber, it is necessary to employ an exhaustion pump having a high compression ratio which can operate with a high velocity of exhaustion (1/min) even if the suction pressure is low. However, in reality, the vacuum exhaustion pump having a high compression ratio is not easily available. Therefore, in the conventional system for the vacuum exhaustion from the process chamber, in order to deal with two challenges, i.e., one that the gas is to be exhausted with a high degree of efficiency using a pump having a relatively low compression ratio, and the other that the pump overload is to be avoided by keeping small a pressure difference between the primary side and secondary side of the vacuum exhaustion system, the pipings having a large diameter (a nominal diameter of approximately 4 inches) have been employed. For the same reason, the diaphragm valve with a large diameter has been employed.

The fluid flow is classified into two regions, i.e., the viscous flow region and the molecular flow region with regard to the relationship between the pressure and the inside diameter of the flow passage. To effect an efficient exhaustion, it is required that the exhaustion be conducted in the viscous flow region. To achieve the viscous flow region, the inside diameter D of the flow passage should be $L \leq D$ (where L: the mean free path of the gas molecule and D: the inside diameter of the flow passage). There exists the relation, $L = 4.98 \times 10^{-3}/P$, between the mean free path of the gas molecule L and the pressure P. On the basis of this, the relationship between the pressure and the inside diameter to attain the viscous flow region inside the pipings is obtained. Accordingly, by raising the pressure higher, the mean free path L can be made smaller with the result that the inside diameter D of the pipings to attain the viscous flow region is made small.

However, as stated above, with the conventional pump having a comparatively small compression ratio (approximately 10), it is not possible to raise the pressure on the discharge outlet side. For example, if the pressure on the chamber side (the intake inlet side) is $10^{-3}$ Torr, the discharge outlet side pressure becomes as low as approximately $10^{-2}$ Torr. This means that the pipings having an inside diameter of 5 cm or more are required to attain the viscous flow region with more certainty. As a result, with the conventional vacuum exhaustion system, there is a problem that since the piping system having a large diameter is required, the facilities are made large-sized. Further, there is another problem that since a larger inside diameter of the vacuum pipe system means a larger volume inside the pipe, it takes a longer time for the vacuum exhaustion Furthermore, to effect the exhaustion operation efficiently in a short time by the vacuum exhaustion system, an expensive vacuum pump having a large compression ratio and a high velocity of exhaustion is needed.

In recent years, however, the pump having high performance capabilities, or specifically, one which realizes a high compression ratio of approximately $10^3 \sim 10^4$ has been developed. As a result, it is now possible to increase the discharge side pressure of the primary pump to approximately 30~50 Torr even when the internal pressure of the process chamber is around $10^{-3}$ Torr. Accordingly, by optimizing the pressure conditions of the process chamber and the vacuum exhaustion system, it is now possible to secure the viscous flow region in the pipings having a small diameter of approximately 0.5 cm.

However, if the pressure is raised as mentioned above, moisture or gas condenses in the vacuum exhaustion piping system and adheres to the inside of the pipings.

Further, even if the condensation and adherence of water, moisture or gas caused by the pressure rise do not occur, the decomposition of the gas remaining inside the pipings happens when the vacuum pump is out of operation. As a result, substances produced by the gas decomposition accumulates inside the pipings and piping parts of the valve, causing the corrosion of the parts, the clogging of the valves by the substances as produced and the valve seat leakages.

To solve such problems, it is required to keep the inside of the piping system lower than the saturated vapor pressure of gas, water or moisture therein. Hence, it is a common practice, with the vacuum exhaustion system, to effect heating (baking). (In the case of water, the saturated vapor pressure is 17.53 Torr at 20° C.) That is, when the temperature is raised by the heating, the saturated vapor pressure rises, making it difficult for the condensation and adherence of water, moisture or gas to occur with the result that the risk of the corrosion and cloggings is reduced. It is known that it is desirable to raise the temperature to approximately 150° C., considering the type of the gas inside the vacuum exhaustion system.

However, the gas is decomposed (or dissociated) when the temperature rises. Here occurs another problem that the substances produced by the decomposition of the gas adhere to the inside of the pipings and, as a result, cause the corrosion and the like.

The decomposition of the gas is caused by catalysis of the metal components of the inner wall of the pipings. FIG. 3 illustrates, as an example, the relationship between the temperatures and the decomposition of various gases in the case of Spron. As apparent from FIG. 3, the gases which are 100 ppm at the room temperature, starts decreasing due to the decomposition along with the rise of the temperature.

In the system for the vacuum exhaustion of the process chamber, a direct touch type metal diaphragm valve is commonly used as, for example, shown in the Patent Literature 1.

Basically, the said diaphragm valve comprises a body provided with a flow-in passage, a flow-out passage, and a valve seat formed between the passages; a diaphragm installed in the body and permitted to rest on and move away from the valve seat; and a driving means installed in the body operating to allow the diaphragm to rest on and move away from the valve seat.

[Patent Literature 1] Japanese Patent No. 3343313

OBJECT OF THE INVENTION

The problems with this type of valve are as follows. That is, the major constituent components such as the body, the diaphragm and the likes are made of metals. In addition, comparing with the pipings, there are found more curvatures and parts where the gas is retained or trapped with the result that there exist some parts where the pressure and temperature are locally changed. Further, since the inside volume is large, a great amount of gas is likely to be trapped and the inside surface areas are large. As a result, the corrosions, cloggings and valve seat leakages caused by the accumulation (or deposition) and adherence of the substances produced by the thermal decomposition (or thermolysis) of the gas are likely to occur.

The present invention has been created to solve the above mentioned problems. An object of the present invention is to provide a diaphragm valve for the vacuum exhaustion system which can prevent the corrosions caused by the accumulation and adherence of the substances produced by the thermal decomposition of the gas, the cloggings caused by the substances as produced, and the valve seat leakages. It is also an object of the present invention to provide a valve for the vacuum exhaustion system which can make the facilities for the vacuum exhaustion system small-sized and, as a result, lower the costs, and further reduce the diameter of the pipings for the vacuum exhaustion system for shortening the vacuum exhaustion time.

DISCLOSURE OF THE INVENTION

The diaphragm valve for the vacuum exhaustion system according to the present invention comprises a body having a flow-in passage, a flow-out passage, and a valve seat formed between the passages; a diaphragm installed in the body and permitted to rest on and move away from the valve seat; and a driving means provided on the body to allow the diaphragm to rest on and move away from the valve seat, wherein a synthetic resin film of a predetermined thickness is coated on the fluid-contacting parts of the afore-mentioned body and diaphragm.

When the driving means is operated for closing the valve, the diaphragm is allowed to rest on the valve seat by the elastic deformation of the diaphragm, thus shutting off the flow of the fluid from the flow-in passage to the flow-out passage.

Conversely, when the driving means is operated for opening the valve, the diaphragm returns to its original shape by self-elasticity and, as a result, moves away from the valve seat, thus allowing the fluid to flow from the flow-in passage to the flow-out passage.

The fluid-contacting parts of the body and diaphragm are coated with the synthetic resin film of the predetermined thickness (for example, thickness of 50~100 μm), preventing the substances produced by the thermal decomposition of the gas from directly contacting and adhering to the liquid-contacting parts. As a result, the liquid-contacting parts are not corroded.

Since the synthetic resin film of the predetermined thickness is coated on the liquid-contacting parts of the body and diaphragm, the diaphragm is allowed to rest on the valve seat via the fluid-contacting parts, thereby making it possible to for the diaphragm to rest on the valve seat more softly than in the case where the two metal parts are brought into a direct contact with each other. As a result, damages to and abrasion of the valve seat and the diaphragm are prevented.

For the synthetic resin film, the fluorine-contained resin is desirable. In particular, polytetrafluoroethylene resin (PTFE), fluorinated ethylene-propylene copolymer (FEP), tetrafluoroethylene-perfluoroalkylevinyl ether copolymer (PFA) are preferred. With this construction, the manufacturing can be made easy because the widely-used common products can be employed, thus reducing the costs.

The parts where the synthetic resin film is coated are desirably the surfaces of the flow-in passage, the flow-out passage and the valve seat, and further the lower side of the diaphragm all of which the fluid is allowed to contact. In this manner, the coating is limited to the parts where the coating is necessary, thus further making it possible to reduce the costs.

Figure 1:
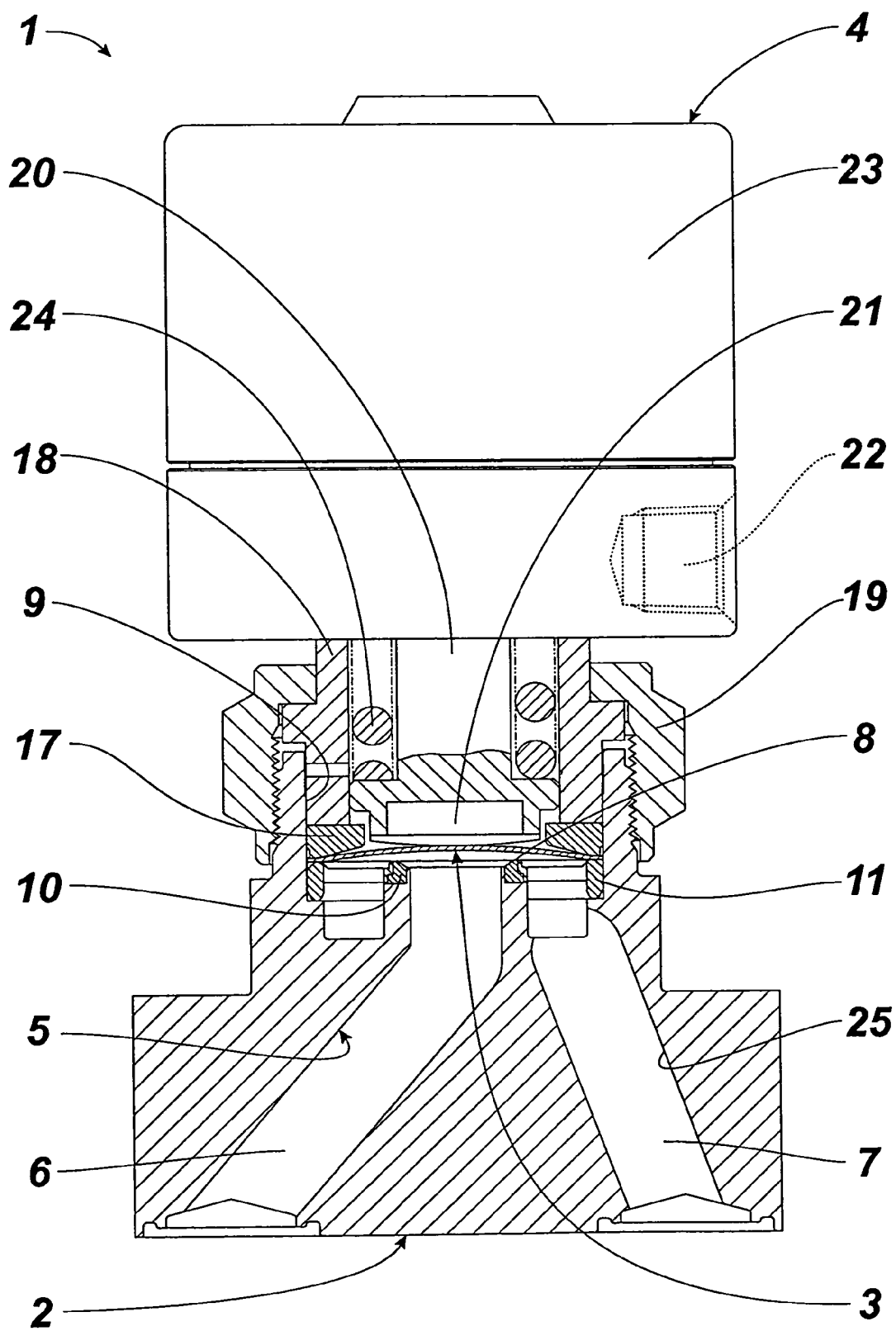
FIG. 1 is a longitudinal sectional view of a diaphragm valve according to the present invention.

| List of Reference Numerals |
| --- |
| 1 a diaphragm valve |
| 2 a body |
| 3 a diaphragm |
| 4 a driving means |
| 5 a synthetic resin film |
| 6 a flow-in passage |
| 7 a flow-out passage |
| 8 a valve seat |
| 9 a valve chamber |
| 10 a valve seat body |
| 11 a holding body |
| 12 a valve seat body accommodating part |
| 13 a holding body accommodating part |
| 14 an engaging step part |
| 15 an engaging step part |
| 16 a communication bore |
| 17 a gasket |
| 18 a bonnet |
| 19 a bonnet nut |
| 20 a stem |
| 21 a diaphragm presser |
| 22 a supply port |
| 23 a cylinder |
| 24 a coil spring |
| 25 a fluid-contacting part |

MODE OF CARRYING OUT THE INVENTION

The embodiment in accordance with the present invention is described hereunder with reference to the drawings.

Figure 2:
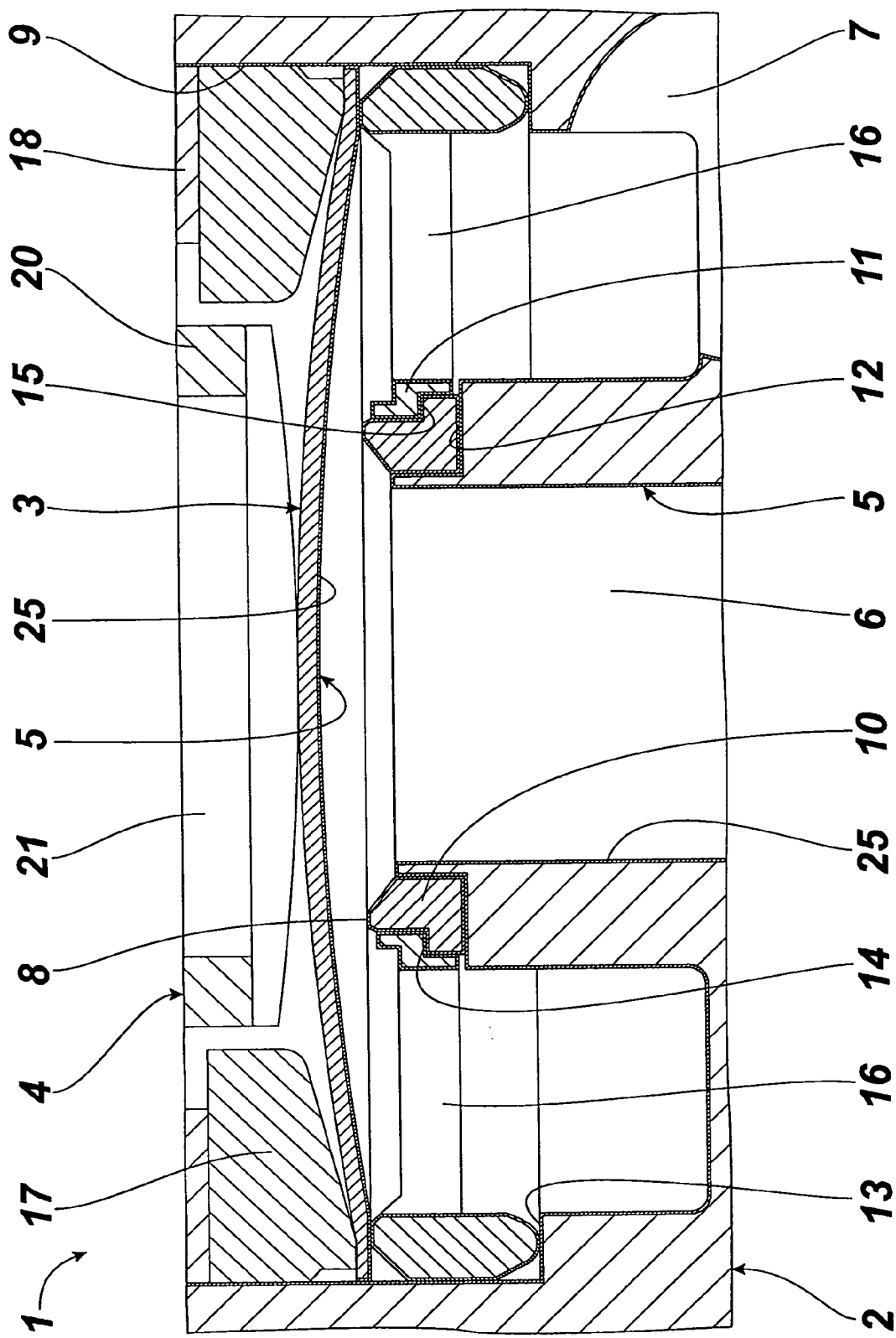
FIG. 2 is a longitudinal sectional view of an enlarged essential part of FIG. 1.
Figure 3:
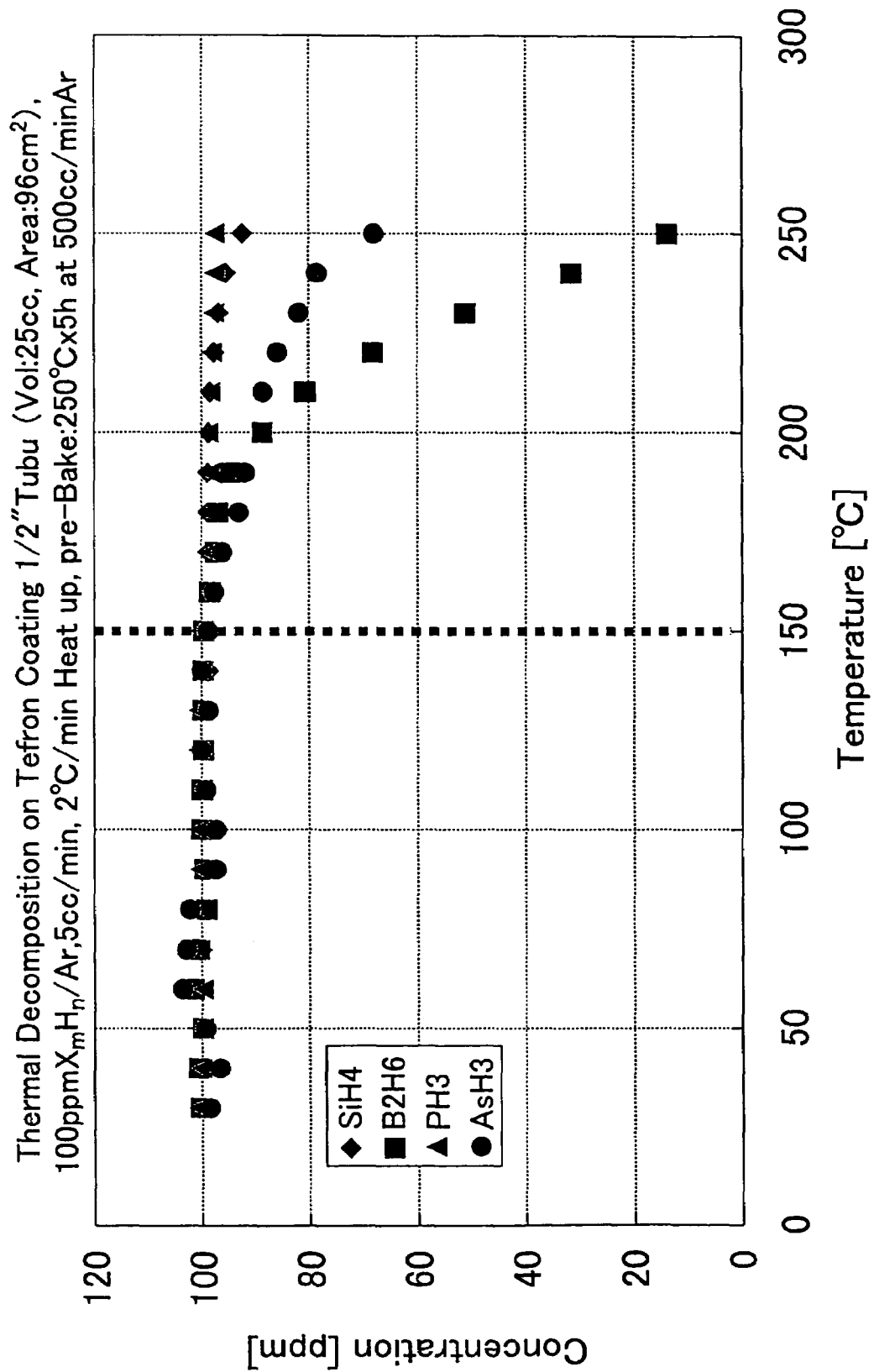
FIG. 3 is a graph to show the relationship between the decomposition and temperatures of various gases where Spron is coated with Teflon.
Figure 4:
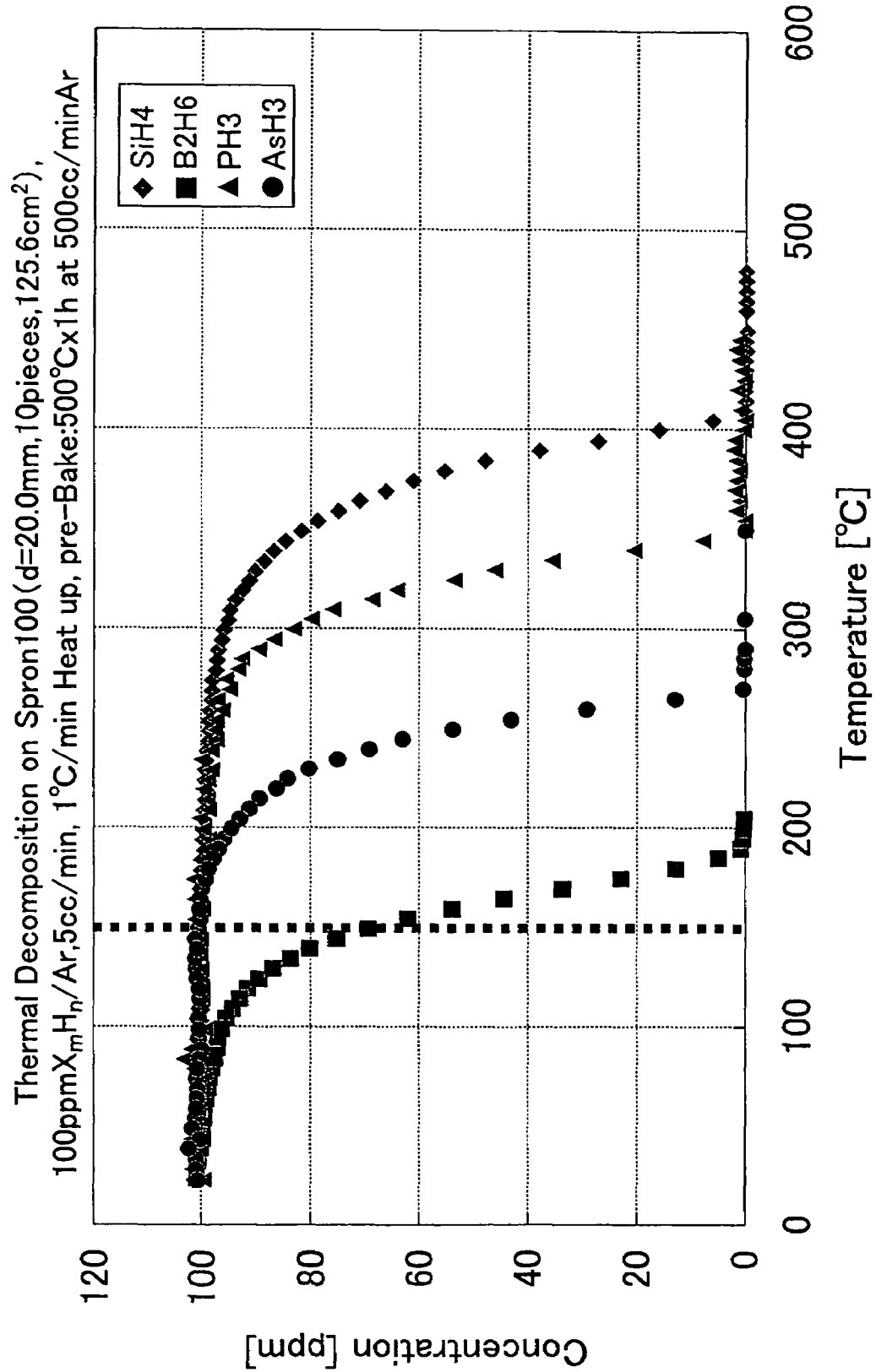
FIG. 4 is a graph to show the relationship between the decomposition and temperatures of various gases where Spron is employed.

FIG. 1 is a longitudinal sectional view of a diaphragm valve according to the present invention. FIG. 2 is a longitudinal sectional view of an enlarged essential part of FIG. 1. FIG. 3 is a graph to show the relationship between the decomposition and temperatures of various gases where Spron is coated with Teflon.

A major part of the diaphragm valve 1 comprises a body 2, a diaphragm 3, a driving means 4 and a synthetic resin film 5. The diaphragm valve 1 is a normally open, direct touch type valve which is employed between a process chamber and a primary pump, or between the primary pump and a secondary pump in the vacuum exhaustion system.

The body 2 includes a flow-in passage 6, a flow-out passage 7 and a valve seat 8 formed between the two passages and made of stainless steel (i.e., SUS316L and the like) in this case. That is, the body 2 comprises the flow-in passage 6, the flow-out passage 7, a valve chamber 9 communicating with the passages 6, 7 and formed with an open upper end, and a valve seat 8 provided between the flow-in passage 6 and the flow-out passage 7 in the chamber 9 and extending upward. An end of the flow-in passage 6 opening into the valve chamber 9 is positioned at the center of the body 2.

The valve seat 8 is formed in a valve seat body 10 which is a separate body from the body 2. The valve seat body 10 is made of stainless steel or synthetic resin (for example, polytetrafluoroethylene resin and the like), and includes a holding body 11 made of the same material which works to fix the valve seat body 10 inside the body 2.

The body 2 is provided with a valve seat body accommodating part 12 which accommodates the valve seat body 10 and a holding body accommodating part 13 which accommodates the holding body 11 and is deeper than the valve seat body accommodating part 12. That is, the valve seat body accommodating part 12 and the holding body accommodating part 13 are formed concentrically at the lower part of the valve chamber 9 of the body 2, centering around the flow-in passage 6.

The valve seat body 10 is ring-shaped and is provided with an engaging step part 14 formed by cutting off at the upper part of the outer periphery thereof.

The holding body 11 is ring-shaped and is provided an the engaging step part 15 formed by cutting off at the lower part of the inner periphery thereof to engage with the engaging step part 14. The holding body 11 is provided with a plural number (4) of communication bores 16 communicating with the flow-out passage 7 of the body 2.

Thus, the holding body 11 is fitted around the valve seat body 10, and also fitted in the valve chamber 9 of the body 2 and accommodated in the holding body accommodating part 13 of the body 2.

The diaphragm 3 is provided in the body 2, and allowed to rest on and move away from the valve seat 8. In this example, the diaphragm 3 made of Spron (austenitic stainless steel) is in the inverted dish shape and is formed of an ultra-thin metal sheet. The diaphragm 3 is placed inside the valve chamber 9, keeping the valve chamber 9 air-tight such that the diaphragm 3 is allowed to rest on and move away from the valve seat 8 by elastic deformation in the upward and downward directions.

The outer periphery of the diaphragm 3 is held between a stainless steel made bonnet 18 and the body 2 with a gasket 17 being placed between the diaphragm 3 and the bonnet 18. The bonnet 18 is fixed on the body 2 with a stainless-steel-made bonnet nut 19 screwed on the body 2.

The driving means 4 is mounted on the body 2 and works to permit the diaphragm 3 to rest on and move away from the valve seat 8. In this example, the driving means 4 is pneumatically operated. The driving means 4 includes a stainless-steel-made stem 20 penetrating through the bonnet 19 and allowed to ascend and descend, and a diaphragm presser 21 made of synthetic resin (for example, polytetrafluoroethylene resin) or synthetic rubber and fitted at the lower end part of the stem 20 to thrust the center part of the diaphragm 3. The driving means 4 is further provided with a cylinder 23 having a supply port 22 to supply the air for operation and mounted on the bonnet 19 to surround the upper part of the stem 20, a piston (not illustrated) mounted on the upper part of the stem 22 to slidably ascend and descend inside the cylinder 23, an O-ring (not illustrated) fitted on the outer periphery of the piston for sealing a gap between the piston and the cylinder 23, and a coil spring 24 to urge the stem 20 downward.

The synthetic resin film 5 is a film of a prescribed thickness with which the fluid-contacting parts 25 of the body 2, the diaphragm 3 and the valve seat body 10 are coated. In this example, Teflon™ of 50~100 μm thick is used for the coating. In the event that the coating is thinner than 50 μm, it is difficult to prevent the catalytic effects of the metal parts. On the other hand, in the event that the coating is thicker than 100 μm, the liquid flow and the operation of the diaphragm 3 of resting on and moving away from the valve seat 8 will be hindered. Hence, it is desirable that the coating is 50~100 μm thick. The fluid contacting parts 25 are the surfaces of the flow-in passage 6, the flow-out passage 7, the valve seat 8 (the valve seat body 10 and the holding body 11), and the lower face of the diaphragm 3.

Any method can be used to coat the synthetic resin film 5. With the present embodiment, the film is formed by the method of application and baking. Needless to say, in the event that the afore-mentioned valve seat body 10 (including the holding body 11) is made of fluorine-contained resin and the like, the forming of the afore-mentioned synthetic resin film 5 on the valve seat body 10 is not necessary.

OPERATION OF THE INVENTION

Next, operation of the present invention constructed as mentioned above is described hereunder.

When the driving means 4 is operated to make the piston and the stem 20 descend, the center part of the diaphragm 3 is pushed downward by the stem 20, and rests on the valve seat 8, thus blocking the communication between the flow-in passage 6 and the flow-out passage 7 to bring the valve closing state.

Conversely, when the driving means 4 is operated to make the piston and the stem 20 ascend, the diaphragm 3 returns to the original shape due to self-elasticity and the fluid pressure in the body 2 so that the diaphragm moves away from the valve seat 8 to open the communication between the flow-in passage 6 and the flow-out passage 7 to bring the valve opening state.

Since the synthetic resin film 5 of the predetermined thickness is coated on the fluid-contacting parts 25 of the body 2 and the diaphragm 3, the substances produced by the thermal decomposition of gas are not allowed to directly adhere to the fluid-contacting parts 25. This prevents the fluid-contacting parts 25 from being corroded. Also, this makes it possible to make the facilities for the vacuum exhaustion system small-sized, as a result, lower the costs, and, furthermore, reduce the diameter of the vacuum exhaustion pipings for shortening the vacuum exhaustion time. Of course, long life of the diaphragm valve 1 is assured.

Since the synthetic resin film 5 of the predetermined thickness is coated on the fluid-contacting parts 25 of the body 2 and the diaphragm 3, the diaphragm 3 is permitted to rest on the valve seat 8 via the fluid-contacting parts 25, thereby making it possible for the diaphragm 3 to rest on the valve seat 8 more softly than in the case where the two metal parts are brought into direct contact with each other. As a result, damages to and abrasion of the valve seat 8 and the diaphragm 3 are prevented.

Teflon for the synthetic resin film 5 is sufficiently heat resistant approximately up to 150° C. against the gases, for example, SiH4 (monosilane), B2H6 (diborane), PH3 (phosphine), AsH3 (arsine) and the like which are used in the semiconductor-related facilities.

FIG. 3 is a graph to show the relationship between the decomposition (concentration) and the temperatures of various gases used in the semiconductor-related facilities where the outer surface of Spron is coated with Teflon. The graph reveals that there is no decomposition of gases, that is, there is no decrease in the gas concentration even in the event that the temperature exceeds 150° C.

In this example, the body 2 and the diaphragm 3 were made of stainless steel or Spron. However, it is possible that other metal materials can be used to manufacture them.

In this example, the diaphragm 3 is made of a sheet of the ultra-thin meal plate. However, it is also possible that the diaphragm 3 is made of a plural number of ultra-thin metal plates stacked one on another.

In this example, the diaphragm 3 is permitted to directly rest on the valve seat 8. However, the diaphragm is not limited to this type. For instance, a disc (not illustrated) can be placed on the lower part of the diaphragm 3 so that the disc is allowed to rest on and move away from the valve seat 8. In this case, it is necessary to urge the disc upward by a spring (not illustrated). It is also possible that a disc (not illustrated) is inserted into the a hollow center part of the diaphragm 3, and the inner peripheral part of the diaphragm 3 and the disc are air-tightly fitted and secured to each other so that the afore-mentioned disc is allowed to rest on and move away from the valve seat 8.

In this example, the driving means 4 was pneumatically operated. However, the driving means 4 is not limited to this type. For example, a hand-operated method, an electromagnetic method, a hydraulic method, and the like can be employed instead.

In this example, the synthetic resin film 5 is made of Teflon. However, other synthetic resin materials can be employed to form the synthetic resin film 5.

In this example, the valve seat 8 is formed on the valve seat body 10 which is a separate member from the body 2. However, the valve seat 8 is not limited to this type. For instance, the valve seat can be integrally formed with the body 2.

EFFECTS OF THE INVENTION

As stated above, the present invention achieves excellent, practical effects as follows:

(1) The valve is provided with the body, the diaphragm, the driving means and the synthetic resin films. In particular, the fluid-contacting parts of the body and the diaphragm are coated with the synthetic resin films of the predetermined thickness, thereby making it possible to completely prevent the dissociation (decomposition) of the gas. As a result, it is possible to prevent the corrosions of the valve members caused by the accumulation and adherence of the substances as produced by the thermal decomposition, the cloggings caused by the substances as produced, and the seat leakages.

(2) Since the thermal decomposition is prevented, it is possible to make the facilities for the vacuum exhaustion system small-sized, and, as a result, to lower the costs. It is also possible to reduce the diameter of the vacuum exhaustion system pipings for shortening the vacuum exhaustion time.

What is claimed is:

1. A diaphragm valve in a vacuum exhaustion system, the diaphragm valve comprising:

a first body having a flow-in passage and a flow-out passage;

a valve seat disposed between the flow-in passage and the flow-out passage, wherein the valve seat comprises a ring-shaped valve seat body and a ring-shaped holding body, wherein the first body includes a valve seat body accommodating part that accommodates the valve seat body and a holding body accommodating part that accommodates the holding body, wherein the valve seat body accommodating part and the holding body accommodating part are formed concentrically at a lower part of a valve chamber of the first body centering around the flow-in passage, and wherein the holding body is provided with a plurality of communication bores that communicate with the out-flow passage, and the holding body is fitted around the valve seat body and is also fitted in the valve chamber of the first body;

a diaphragm installed in the first body and permitted to rest on, and move away from, the valve seat, wherein the ring-shaped holding body fitted around the ring-shaped valve seat body is disposed in the valve chamber so as to be accommodated by the holding body accommodating part of the first body, and wherein an outer periphery of the diaphragm is disposed above an outer periphery of the ring-shaped holding body so that the diaphragm and the ring-shaped holding body are pressed against the first body by a bonnet by way of a gasket disposed above the outer periphery of the diaphragm so as to keep the valve chamber air-tight; and a driving means provided on the first body for allowing the diaphragm to rest on and move away from the valve seat, wherein synthetic resin films of a predetermined thickness coat fluid-contacting parts of the body and the diaphragm, wherein the synthetic resin films are fluorine-containing resin films that are 50 to 100 μm thick and the fluid-contacting parts coated by the synthetic resin films include surfaces of the flow-in passage, the flow-out passage, the valve seat of the first body, and also a lower surface of the diaphragm, and wherein the synthetic resin films are heat resistant approximately up to 150° C. against monosilane gas, diborane gas, phosphine gas and arsine gas.

2. A diaphragm valve in a vacuum exhaustion system as claimed in claim 1, wherein the fluorine-containing resin films comprise fluorine containing resin selected from the group consisting of polytetrafluoroethylene resin, fluorinated ethylene-propylene copolymer, and tetrafluoroethylene-perfluoroalkylevinyl ether copolymer.

3. A diaphragm valve in a vacuum exhaustion system as claimed in claim 2, wherein the diaphragm and the first body comprise steel or austenitic stainless steel.

4. A diaphragm valve in a vacuum exhaustion system, the diaphragm valve comprising:

(a) a first body having a flow-in passage and a flow-out passage;(b) a valve seat disposed between the flow-in passage and the flow-out passage, wherein the valve seat comprises i. a stainless steel ring-shaped valve seat body; and
　　ii. a ring-shaped holding body that is fitted around the ring-shaped valve seat body so as to hold the ring-shaped valve seat body, wherein the first body further includes a valve seat body accommodating part that accommodates the valve seat body and a holding body accommodating part that accommodates the holding body;
(c) a valve chamber formed in the first body and communicating with the flow-in passage and the flow-out passage and formed with an open upper end;
(d) a diaphragm installed in the body and permitted to rest on, and move away from, the valve seat, wherein the diaphragm is formed of a thin metal sheet;
(e) a driving means provided on the first body for allowing the diaphragm to rest on and move away from the valve seat, wherein the driving means comprises
　　i. a stem penetrating through a bonnet so as to ascend and descend; and
　　ii. a diaphragm presser fitted at a lower end part of the stem to thrust a center part of the diaphragm,
wherein the holding body accommodating part is formed to extend deeper into the first body than the valve seat body accommodating part, and the valve seat body accommodating part and the holding body accommodating part are formed, respectively, in the first body at a middle area and an outer periphery of a lower part of the valve chamber centering around the flow-in passage,
wherein the ring-shaped holding body fitted around the ring-shaped valve seat body is disposed in the valve chamber so as to be accommodated by the holding body accommodating part of the first body, and
wherein an outer periphery of the diaphragm is disposed above an outer periphery of the ring-shaped holding body so that the diaphragm and the ring-shaped holding body are pressed against the first body by the bonnet by way of a gasket disposed above the outer periphery of the diaphragm so as to keep the valve chamber air-tight;
(f) a first fluid contacting part comprising the flow-in passage, the flow-out passage, and the valve seat contacting part of the first body; and
(g) a second fluid contacting part comprising a fluid contacting part of the diaphragm, wherein the first fluid contacting part and the second fluid contacting part are coated by a fluorine-containing resin film having a thickness of 50-100 µm.

5. A diaphragm valve in a vacuum exhaustion system as claimed in claim 4, wherein the fluorine-containing resin film is heat resistant approximately up to 150° C. against monosilane gas, diborane gas, phosphine gas and arsine gas.

6. A diaphragm valve in a vacuum exhaustion system as claimed in claim 4, wherein the valve seat accommodating part and the holding body accommodating part are formed concentrically at the lower part of the valve chamber of the first body centering around the flow-in passage.

7. A diaphragm valve in a vacuum exhaustion system as claimed in claim 6, wherein the holding body is provided with a plurality of communication bores that communicate with the out-flow passage.

8. A diaphragm valve in a vacuum exhaustion system as claimed in claim 4, wherein the fluorine-containing resin films comprise fluorine containing resin selected from the group consisting of polytetrafluoroethylene resin, fluorinated ethylene-propylene copolymer, and tetrafluoroethylene-perfluoroalkylevinyl ether copolymer.

9. A diaphragm valve in a vacuum exhaustion system as claimed in claim 8, wherein the diaphragm and the first body comprise austenitic stainless steel.

* * * * *